(12) United States Patent
Jonsson et al.

(10) Patent No.: US 10,929,201 B2
(45) Date of Patent: Feb. 23, 2021

(54) METHOD AND SYSTEM FOR IMPLEMENTING GENERATION LOCKS

(71) Applicant: Wind River Systems, Inc., Alameda, CA (US)

(72) Inventors: Kenneth Jonsson, Alameda, CA (US); Markus Carlstedt, Alameda, CA (US)

(73) Assignee: Wind River Systems, Inc., Alameda, CA (US)

(*) Notice: Subject to any disclaimer, the term of this patent is extended or adjusted under 35 U.S.C. 154(b) by 650 days.

(21) Appl. No.: 14/920,110

(22) Filed: Oct. 22, 2015

(65) Prior Publication Data

US 2017/0116247 A1 Apr. 27, 2017

(51) Int. Cl.
*G06F 7/00* (2006.01)
*G06F 9/52* (2006.01)

(52) U.S. Cl.
CPC .............. *G06F 9/528* (2013.01); *G06F 9/52* (2013.01)

(58) Field of Classification Search
CPC ........................................................ G06F 9/528
See application file for complete search history.

(56) References Cited

U.S. PATENT DOCUMENTS

| | | | | |
|---|---|---|---|---|
| 8,560,511 B1* | 10/2013 | Matthews | ........... | H04L 43/16 707/704 |
| 8,719,225 B1* | 5/2014 | Rath | ........... | G06F 16/273 707/634 |
| 8,949,614 B1* | 2/2015 | Jernigan, IV | ........... | H04L 67/1097 713/178 |
| 9,875,270 B1* | 1/2018 | Muniswamy Reddy | ........... | G06F 16/23 |
| 2006/0041558 A1* | 2/2006 | McCauley | ........... | G06F 17/30309 |
| 2008/0104145 A1* | 5/2008 | Lipman | ........... | G06F 11/1456 |
| 2008/0216073 A1* | 9/2008 | Yates | ........... | G06F 9/30189 718/100 |
| 2010/0017409 A1* | 1/2010 | Rawat | ........... | G06F 16/1774 707/E17.007 |
| 2010/0235321 A1* | 9/2010 | Shukla | ........... | G06F 16/178 707/610 |
| 2011/0196833 A1* | 8/2011 | Drobychev | ........... | G06F 16/248 707/634 |
| 2015/0356110 A1* | 12/2015 | Lin | ........... | G06F 16/1774 707/704 |

* cited by examiner

*Primary Examiner* — Eliyah S. Harper
(74) *Attorney, Agent, or Firm* — Fay Kaplun & Marcin, LLP

(57) ABSTRACT

A system and method for implementing a generation lock for protecting a data structure is provide. The systems and methods synchronizes read and write transactions for a protected data structure in a multitasking environment and provides low latency and improved scalability. For example, a system and method for implementing a generation lock for protecting a data structure may be provided. The generation lock provides an improved mechanism for restricting access to a data structure that is typically read more often than written. Specifically, the generation lock provides a method for reading and writing to a protected data structures that has a low average latency as compared to traditional read/write semaphores. The generation lock also provides a mechanism in which the system is scalable, meaning that the addition of additional processor cores is capable of increasing the performance, e.g., rate of executing requests, of the system, and is not or is not substantially rate limited by a shared resource.

17 Claims, 3 Drawing Sheets

METHOD AND SYSTEM FOR IMPLEMENTING GENERATION LOCKS

BACKGROUND

In a multitasking computing environment having multiple processing tasks, CPU cores simultaneously making requests to access (e.g., either read from or write to) a shared data structure, there is often a need to synchronize the currently executing tasks. Synchronization ensures that what is being read or written by various tasks or processes remains consistent. This requirement may be facilitated by the use of a shared resource that buffers requests received from each of the different sources. The shared resource may determine an order the requests are processed or provides a shared buffer for storing the requests and executing them in a sequential manner.

Synchronization of data between tasks may be performed by reading and writing information about the purpose of the task for accessing the shared data—i.e., whether it will only read the shared data, or if it will write to the shared data. Such synchronization of information is often conveyed through a small piece of memory. For example, this memory may be cached as part of a CPU design. CPU cache hierarchies may organize the computer memory into small sections called "cache lines," and each such cache line may have one of several states, and the basic states may be: "invalid" (the cache line does hold valid data), "exclusive" (this is the only cache line in the system to cache this memory region), "shared" (more than one cache line may cache this memory) and "modified" (like exclusive, with the addition that the content in the cache line might be different compared to content in memory). Any write operation to a memory having a CPU cache hierarchy will transition the cache line to the "modified" state, while all other cache line of the same memory region owned by CPU-cores may be set to an "invalid" state. This is a resource intensive, expensive operation especially for a memory to which is frequently written and accessed by multiple CPU-cores, such as, for example, memory used to synchronized access to data shared by multiple tasks.

A Read/Write semaphore (R/W-semaphore) needs to keep record of the number of concurrent reading tasks accessing the protected shared data and ensure that only a single writing task accesses the data at any point in time. This recordkeeping require two write transactions to a memory occupied by the R/W-semaphore for per access of the shared data, whether the accessing task is seeking to read or write to the shared data. This effectively limits the concurrency level of data protected by a R/W-semaphore to a maximum of about 2 to 4 CPU cores.

The addition of more CPU cores to a multitasking system that is synchronized via a shared cache-line will not be able to further enhance the overall processing performance or speed beyond an upper threshold—i.e., the rate that multiple processes can write to the shared cache line. The shared cache-line becomes a bottleneck for all processes that need to access the protected data structure and sets a maximum rate the system can process multitask read and write requests for the protected data structure, regardless of the number of processing cores that are present within the system. Thus, the share cache-line limits the overall ability of a multi-tasking and multi-core system to scale and provide enhanced processing proportional to the amount of resources added. The maximum effect one can get from adding CPU-cores to a system may be limited by Amdahl's law.

SUMMARY

In accordance with the foregoing objectives and others, one exemplary embodiment provides a method for reading from a generation lock protected data structure. The method comprises a step (a) for receiving a read request from a processor to read a select portion of data from the data structure. The data structure comprises N generations. Each generation of the data structure has a data storage portion and a generation identifier associated therewith. The generation identifier is an integer from 0 to N, wherein 1 is associated with an earliest-created generation in the data structure, and N is associated with a most recently modified generation of the data structure. The method further comprises a step (b) for creating a read context in response to the read request. The method also comprises a step (c) copying the select portion of data from the data storage portion of the most recently modified generation of the data structure to a memory buffer. The method further comprises a step (d) for determining if the most recently modified generation in the data structure remained consistent from step (b) to step (c), and if not, repeating steps (b) to (d). Additionally, step (d) may include closing the read context and restricting the processor from further accessing the data structure without providing a second read request. For example, the method may use the outcome of step (d) to declare that data copied in step (c) as valid if the most recently modified generation did not change. Alternatively, step (d) may declare that the data copied in step (c) may be inconsistent and that the read operation may need to be restarted from step (b).

Another exemplary embodiment provides a method for writing to a generation lock protected data structure. The method comprises a step (a) for receiving a write request from a processor to write data to the data structure. The data structure may comprise N generations. Each generation of the data structure having a data storage portion and a generation identifier associated therewith. The generation identifier is an integer from 0 to N, wherein 1 is associated with an earliest-created generation in the data structure, and N is associated with a most recently modified generation of the data structure. The method also comprises a step (b) for generating a write lock in response to the write request. The write lock prohibits another processor from concurrently writing to the data structure. The method further comprises a step (c) for determining the generation identifier for the most recently modified generation of the data structure. The method further comprises a step (d) for adding a new generation to the data structure, and writing data to the new generation. The method also comprises a step (e) for releasing the write lock. In addition, the method comprises a step (f) for assigning a new generation identifier to the new generation, wherein the new generation identifier corresponds to a value corresponding to the generation identifier determined in step (c) incremented by 1. In a further exemplary embodiment a system is provided. The system may comprise a plurality of processors, a generation lock protected data structure, the data structure comprises N generations, each generation having a data storage portion and a generation identifier associated therewith. The generation identifier is an integer from 0 to N, wherein 1 is associated with an earliest-created generation in the data structure, and N is associated with a most recently modified generation of the data structure. The system further comprises a first set of instructions executing on at least one of the plurality of processor, the first set of instructions being operable to: (a) receive a first read request to read a select portion of data from the data structure; (b) create a read context in response to the read request; (c) copying the select portion of data from the data storage portion of the most recently modified generation of the data structure to a memory buffer; and (d) determining if the most recently modified generation remained consistent from step (b) to step (c), and if not, repeating steps (b) to (d), wherein the processor is restricted from further accessing the data structure without providing a second read request. The system may also comprises a second set of instructions executing on at least one of the plurality of processor, the second set of instructions being operable to: (e) receive a write request to write data to the data structure; (g) generating a write lock in response to the write request, the write lock prohibits concurrently writing to the data structure; (h) determining the generation identifier for the most recently modified generation of the data structure; (i) adding a new generation to the data structure, and writing data to the new generation; (j) releasing the write lock; and (k) assigning a new generation identifier to the new generation, wherein the new generation identifier corresponds to a value corresponding to the generation identifier determined in step (h) incremented by 1.

DETAILED DESCRIPTION

Figure 1:
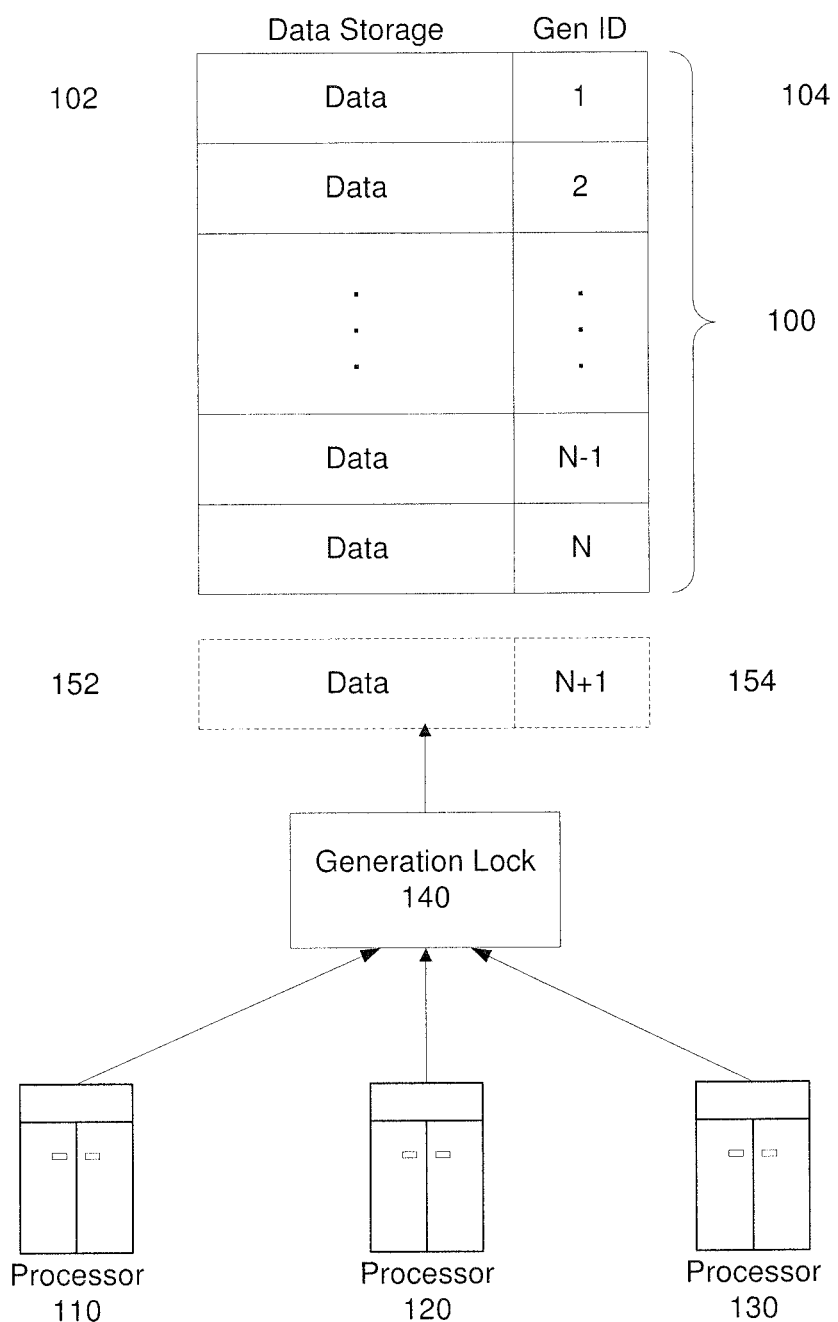
FIG. 1 shows an exemplary embodiment for a system having a data structure that is synchronized by a generation lock.

The exemplary embodiments provide systems and methods for synchronizing read and write transactions for a protected data structure in a multitasking environment that provides low latency and improved scalability. For example, a system and method for implementing a generation lock for protecting a data structure may be provided. The exemplary embodiments may be further understood with reference to the following description of exemplary embodiments and the related appended drawings, wherein like elements are provided with the same reference numerals.

A computing system may use a lock, such as a semaphore, to control access to data and/or resources. The data and/or resources protected in this manner may be any type of computing resource that may need to be accessed by multiple processing cores and/or multiple processing threads, such as a network interface, a device port, etc. Locks may be advisory, wherein each executing thread acquires the lock before accessing the corresponding data, or may be mandatory, wherein an attempt to make unauthorized access to a locked resource will force an exception. Some locks may implement a shared mode, wherein several threads may simultaneously access a shared lock for read and/or write data access.

In one exemplary embodiment, a generation lock to a data structure may be implemented. The generation lock provides a specialized type of synchronization that provides improved optimization for data structures that are read more often then they are modified. For example, such data structures may include state keeping data used within a network stack, subsystems in an operating system, file descriptor to operation system object mapping, memory databases with high read-to-write ratio, etc. The generation lock provides an improved mechanism for restricting access to a data structure that is typically read more often than written. In particular, the generation lock may allow a task to read a piece of shared data from the data structure without requiring a separate write operation to a shared memory location, such as a cache-line, for synchronizing the concurrent tasks. Therefore, one can avoid transitioning shared cache line(s) to a "modified" state, and setting cache line(s) for that data in an "invalid" state on other CPU-cores. Use of a shared cache-line a processing intensive and expensive operation that also increases the cost for the other CPU-cores in a subsequent operation, specifically, when these other CPU-cores attempt to access the memory locations that are no longer cached, i.e., where the cache line is set to an "invalid" state.

More particularly, the generation lock provides a method for reading and writing to a protected data structures that has a low average latency as compared to traditional read/write semaphores. Additionally, the system may include an increasing amount of processor cores to increase performance, e.g., rate of executing requests, of the system. In particular, the exemplary embodiments of the generation lock provide a mechanism in which the system is scalable, meaning that the addition of processor cores may increase the performance, e.g., rate of executing requests, of the system, and is not or is not substantially rate limited by a shared resource. More particularly, the performance of a system having a generation lock may be improved by the addition of further processor cores, without any practical limitations as to size. For example, the generation lock provides a scalable and low latency mechanism even when there are a large number of concurrent network stack users.

Moreover, the generation lock is configured to provide a bound upper limit on latency regardless of the type or size of the system. In one particular example, some of the shared data may only be read by concurrently running tasks or processes. Therefore, the time that it takes for any read operation to complete the transaction with the data structure may be limited only by the size and organization of the shared data, and the speed of the system executing the requests. The upper limit exists because the number of computation steps is finite and defined by the organization and size of the shared data.

In another example, there may be at least one write request that occurs concurrently with a plurality of reading operations, which cannot be accomplished with R/W-semaphores. In this particular example, the average latency may be lower for reading operations as compared to R/W-semaphores. An upper bound on read latency may be provided on real-time operating systems, for example, the VxWorks operating system by Wind River. The upper bound corresponds to the time it takes to conduct an "optimistic read," which is when the read transaction start and end within the same generation of data, e.g., without changing which generation of data of the data structure is currently in use. A second "pessimistic read" may be conducted if the optimistic read fails. The "pessimistic read" may acquire a write lock to ensure that no write operation may run concurrently with a read operation (other optimistic reads can still progress concurrently with a pessimistic read, and therefore the scalability for reading is preserved). A real-time operating system may be used to provide an upper bound for the amount of time needed to acquire a write lock for a task having the highest priority out of a plurality of concurrent tasks.

An exemplary embodiment of a system 10 having a data structure 100 that is restricted by a generation lock 140 is shown in FIG. 1. The system 10 may be implemented in a multicore computing environment that comprises a plurality of processor cores 110, 120, 130, each making either a read and/or write request for the data structure 100 that is moderated by a generation lock 140. The generation locks 140 serves as a synchronization mechanism for prioritizing read and write requests, and preserving each previous state of the data as it is modified. In one embodiment, the synchronization mechanism may track each iteration of a previous state of data by preserving each version of the data before it is modified, and assigning each version with a unique generation identifier for each valid state of data.

The processor cores 110, 120, 130 may be individual microprocessors that are running in parallel as part of a single computing device, may be separate microprocessors that are part of separate computing devices, may be software processes acting as processor cores, may be virtual cores, or may be any other similar elements capable of executing computing processes and requesting access to computing resources. That is, while the term processor core, processor, or core is used herein to describe the entity that is attempting to gain access to a computing resource, those skilled in the art will understand that the entity is not limited to a hardware processor core, but may include any number of execution threads that may request access to the computing resource. The processor cores 110, 120, 130 may be part of a multi-processor arrangement, such as, for example a multi-core processor or multiple threads executing on a single processor. While three processors cores are shown in the exemplary embodiment of FIG. 1, those skilled in the art will understand that the system 10 may include any suitable number (i.e., two or more) of processor cores. For example, the system 10 may include at least four (4) or at least eight (8) processor cores.

In one exemplary embodiment, the generation lock protected data structure 100 may comprise a mutex that can be accessed (e.g., read, write or a combination of the two) by a plurality of processors. In some embodiments, the data structure 100, e.g., mutex, may be configured to allow for priority inversion and priority queue order, such as, for example in the VxWorks operating system by Wind River.

In certain multitasking operation systems, each task may be assigned a priority. In a real-time operating system, the tasks may be executed in an order from the highest to the lowest priority. Priority inversion may occur when a task with a lower priority includes a lock that a task having a higher priority must acquire. The higher priority task may not be permitted to progress without obtaining an attribute, such as a lock from a lower priority task. Therefore, an intermediate task with a priority higher than the tasking providing the attribute, which has a lower priority, could be permitted to access restricted resources, such as the CPU, before the higher priority task is finished. In this situation, the intermediate task prevents the task providing the attribute, e.g., lock, from executing and thus, the higher priority task is delayed to after execution of the intermediate task even though it was assigned a higher priority order. This may be referred to as priority inversion, which is when a later task is granted get access to the CPU-resources, and executed before a task with a higher priority. An operating system with protection from priority inversion, such as, for example, a real-time operating system, may detect that a lower priority task that provides an attribute, e.g., a lock, is a prerequisite for execution of a higher priority task. The operating system may provide protection from priority inversion by temporarily modifying the priority order of the task that is providing the attribute, e.g., the lock, and may increase its priority order to that of the higher priority task, and thereby preventing diversion of CPU-resources to an intermediate task before the higher priority task is completed. The lower priority task reverts back to its original priority once the desired attribute, e.g., lock, for the higher priority task is provided.

A priority order queue may be used to determine the order of two different tasks having different priorities that require access to the same resource, e.g., same lock that is held by a third task. When the third task releases the lock, only one of the two competing tasks may have access. Typically, the order of execution may be based on a first-in first-out (FIFO) methodology where tasks that have been waiting for the lock the longest is granted access first. However, a priority order queue changes the order of execution and selects waiting tasks based on their priority—a higher priority task may be selected first and tasks having the same priority may be selected in FIFO order.

The above-described exemplary embodiments may be utilized to synchronize read and write transactions to any form of data structure that is protected by a generation lock, for example, the data structure may include a network stack. The exemplary data structure may be implemented on any suitable computer-accessible medium (e.g., RAM, ROM, hard drive, or other storage device). The computer-accessible medium may be a non-transitory computer-accessible medium.

As shown in FIG. 1, the data structure 100 may include one or more generation, each generation containing a data storage portion 102 and a generation identifier ("Gen ID") 104. The Gen ID 104 of each generation may be an integer. Each generation of the data structure 100 may be in a memory area that remains valid for the duration of the useful period of the data structure 100. For example, the data storage portion 102 of a previous version of a data structure 100 (e.g., having a Gen ID of N−1) is to remain in a memory area that is valid, even after a new generation (e.g., having a Gen ID of N) containing a new version of data has been added to the data structure 100. By requiring the memory areas that are used for earlier generations of the data structure 100 remain valid, the system 10 can provide a liveness guarantee when subject to concurrent requests to access the protected data structure 100 from a plurality of tasks, threads, processes, and/or processor cores 110, 120, 130. In an alternative embodiment, the one or more generations of data may include integer Gen ID's and implemented in two alternating memory areas, for example, generations having an odd integer Gen ID may utilize a first memory location whereas generations having an even integer Gen ID may utilize a second memory location.

In some embodiments, each generation of the data structure 100 can only be accessed by the requesting task, thread, process from processor cores 110, 120, 130 by copying and/or changing the values stored within the data structure 100 therein, and cannot be referenced by any tasks, threads, processes from the processor cores 110, 120, 130 by reference, e.g., a pointer that is directed to any data storage portion 102 or any other portion of the data structure 100. The data storage portion 102 of each generation may include a version of the data that is stored within the data structure. In some embodiments, a lower Gen ID denotes a generation containing an earlier version of data stored therein. For example, the Gen ID 104 may be an integer from 0 to N, where N denotes the number of generations within the data structure 100. In particular, a Gen ID of 1 may denote a first generation containing the earliest version of data within the data structure 100, whereas a Gen ID of N may denote a most recently modified generation of the data structure 100. The exemplary data structure 100 as shown in FIG. 1 provides a lock mechanism that does not require the use of a shared cache-line, which is typically a rate-limiting component of performance (e.g., rate of data processing) in a multitasking, multi-core system. Therefore, FIG. 1 shows a system 10 having improved scalability.

In some embodiments, the data storage portion 102 of each generation may include two memory areas and/or references to memory areas (e.g., handle) that may be accessed by the processor cores 110, 120, 130—one memory area or handle for storing the current generation of data, and the other memory area or handle representing the next generation of data to be written. Therefore, the data structure may include 2*N different memory areas and/or references to memory areas. In one embodiment, the data storage portion 102 of each generation may include two memory areas. In another embodiment, the data storage portion 102 of each generation may include two references to memory areas (e.g., handle). Where the amount of data held by each data storage portion 102 is large, it may be more efficient to allocate 2*N references to memory areas (e.g., handles) instead of 2*N memory areas for the data structure 100. In a further embodiment, the data storage portion 102 of the different generations in the data structure 100 may be a combination of memory areas and references to memory areas. In particular, the data storage portion 102 of each generation may include one memory area and one handle.

In an alternative embodiment, although the data structure may include N generations, it may be implemented using two memory regions, because only a single write operation is permitted to access the data structure at any point in time. In particular, a first physical memory region may correspond to a Gen ID of N, which may represents current generation to from which data may be read. A second physical memory region may correspond to a Gen ID of N+1, which may represent a next generation of data within the data structure that may be written by a write operation. The second physical memory region may be used as an intermediate working area for the duration of a write operation to construct a next generation of data within the data structure. As another example, generations having an odd integer Gen ID may utilize a first memory location whereas generations having an even integer Gen ID may utilize a second memory location.

The data structure 100 as shown in FIG. 1 may be accessed by a plurality of tasks, threads, processors and/or processor cores 110, 120, 130 either for a read transaction or a write transaction. The exemplary generation lock 140 described below does not require a sequentially consistent compare-and-swap (CAS) instruction to achieve synchronization. Instead, the exemplary generation lock 140 described below utilizes load-acquire and store-release semantics to maintain consistency across multiple read and/or write transactions from a plurality of tasks, threads, processors and/or processor cores 110, 120, 130 for conducting read and/or write transactions. The exemplary generation lock 140 also typically allows for read transactions to concurrently occur with other read transactions or a write transaction. The exemplary generation lock 140 may provide a wait-free mechanism to synchronize a plurality of read transactions, when write transactions are not being requested. In other embodiments, the exemplary generation lock 140 may provide a wait-free mechanism to synchronize a plurality of read transactions even when a single write transaction is present—such as when the frequency of the write operations are limited that at least one read transaction may be completed within the time frame of each write transaction. Furthermore, the load-acquire and store-release semantics utilized by the exemplary generation lock 140 provides a secure and efficient method for synchronizing multiple requests to write a data structure 100 protected by a generation lock 140. The load-acquire and store-release semantics provide a mechanism to enforce an order among multiple requests for write transactions from a plurality of different sources.

The load-acquire and store-release semantics may be implemented in both a read operation and a write operation. For example, the start of a read transaction may utilize load-acquire semantics. In particular, at the start of the read transaction, a load-acquire semantic may be applied when the request is performed on a current generation within the data structure. At the end of the read transaction, to check whether the read transaction successfully acquired consistent and synchronized data, a sequentially consistent load semantic may be used. Similarly, the start of a write transaction may also utilize load-acquire semantics, which may be automatically set by a CPU. In typical CPU architectures, write transactions may be serialized through any suitable lock as long as the write transaction to access a particular generation of the data structure utilizes a single hardware memory operation. Store-release semantics may be used to finish a write transaction. In certain embodiments, the store-release semantics may also be applied automatically performed a CPU. Alternatively, full memory fences coupled with a store or a load operation may be used to create sequentially consistent load and stores instead of using the load-acquire and store-release semantics. The full memory fences are a stronger form of barrier, but are computationally more expensive as compared to load-acquire and store-release semantics. However, full memory fences are typically available in multi-core CPUs, and therefore, may be useful for implementing the generation lock described herein. In certain types of multi-core CPUs, load-acquire and store-release semantics may be available and thus, may be used to create a more optimized version of the generation lock described herein.

In some embodiments, the generation lock 140 may be initialized before the data structure 100 is used. For example, the generation lock 140 may be initialized before any data is written to the data structure. In certain embodiments, once the generation lock 140 is initialized, it may not be eliminated from the computer accessible storage medium, e.g., memory, within a multitasking computing system 10. Moreover, only one generation lock 140 may be initialized for any particular data structure 100. Each generation lock 140 protecting a data structure 100 should be initialized only once. If a generation lock 140 cannot be initialized, for example, there may be inadequate capacity in the computer accessible storage medium, e.g., memory, to allocate to the generation lock 140, an error message may be returned indicating that a generation locked data structure 100 cannot be implemented.

A exemplary function for initializing a generation lock may be represented as follows:

---

STATUS genInit
(
GEN_LOCK * lock        /**< generation lock to initialize */

```
);
Returns
    OK, or ERROR if the lock cannot be initialized.
Errno
    S_semLib_NOT_ENOUGH_MEMORY
```

Not enough memory available to create the lock.

In certain embodiments, the memory areas and/or handles that are used for preceding generations of the data structure 100 may be maintained as valid and may not be freed. Where the data storage portion 102 of each generation includes two memory areas and/or references to memory areas (e.g., handle), there may be a set of memory areas that would not be utilized to hold any data that is protected by the generation lock 140. Nonetheless, preservation of all of the generations in the data structure 100 may provide a liveness guarantee in response to concurrent requests from a plurality of tasks, threads, processes and/or processor cores 110, 120, 130, and is particularly useful for safety critical system, such as an operating system. For example, all dynamic memory in a safety critical system may be allocated at an initialization stage for the data structure 140 and may not be released. Furthermore, no additional memory and/or handles may be allocated after the system successfully initializes the data structure 140.

Figure 2:
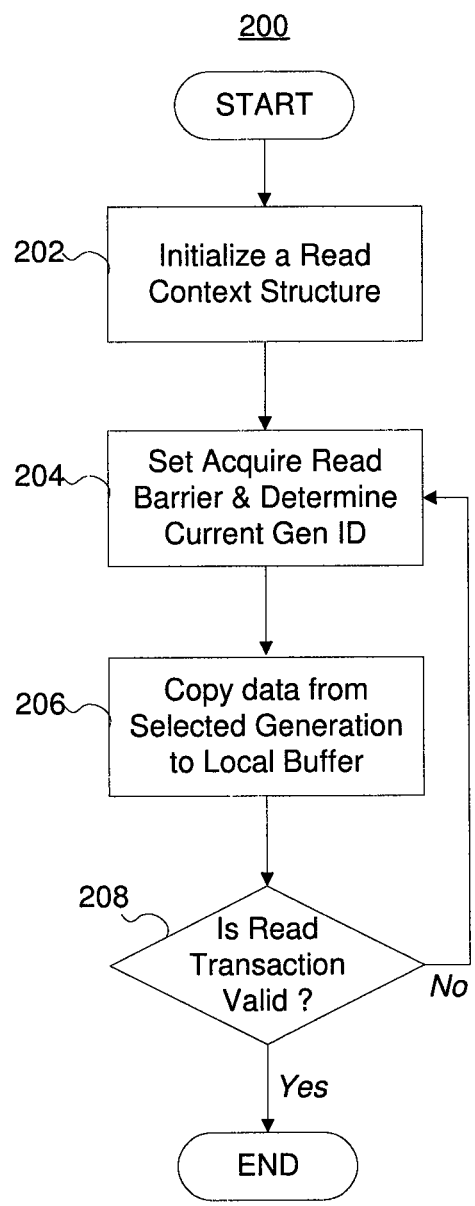
FIG. 2 shows an exemplary method for reading from a generation lock protected data structure in a multitasking processing environment.

FIG. 2 illustrates an exemplary method for reading from a generation lock 140 protected data structure 100. The method 200 described herein provides a method for reading data from a generation lock protected data structure after receiving a request for a read transaction with the protected data structure 100. The exemplary method 200 described below allows for retrieval of data from the most recent generation of data while allowing for concurrent read and/or write transactions. This concurrent processing of read transactions along with other read transactions or write transactions allows for an efficient method for processing data in a multitasking system receiving requests for read and write transactions from a variety of different sources. The method 200 will be described with reference to the exemplary system 10 of FIG. 1; however, those of skill in the art will understand that this is only exemplary and that the method 200 may be implemented by various other systems as well.

In step 202, a read context structure is initialized for retrieval of data from the data structure. A read context may be created for every read transaction requested via the generation lock 140. In addition, the read context structure may include a mechanism for tracking whether the requested read operation has been started to prioritize concurring read request(s) and avoid live-lock of read transactions. More particularly, step 202 may include initializing a generation lock context for a request to read a snapshot of the data stored within a generation lock 140 protected data structure 100, e.g., data stored within the data storage portion 102 of a most recent generation of the data structure 100. In certain embodiments, step 202 is limited only to initialization of a generation lock context in response to a read request. An exemplary implementation of step 202 may be represented, for example, as a "genRdCtxInit" function for initializing a generation lock as follows:

```
void genRdCtxInit
(
GEN_LOCK_RD_CTX * ctx,   /**< storage for callee read context */
GEN_LOCK *        lock   /**< lock to associate with [ctx] */
);
```

After a read context is created, the read transaction is initiated in step 204. Specifically, step 204 selects the appropriate generation from the data structure 100 that is to be read. In particular, the selected generation may correspond to a most recently modified generation of the data structure 100, or the current generation that is allowed to be accessed via the generation lock 140. Data protected by a generation lock may go through a series of generation, where each write transaction produces a new generation containing new snapshots/version of data, and that each generation of the data structure 100 may be identified by a unique Gen ID. The Gen ID may be a value that is implemented in binary, for example, in a 32-bit binary code.

In one exemplary embodiment, the data structure 100 may be implemented in two memory regions, where a current generation of the data structure is implemented in a first memory region and a next generation of data may be written to the other memory region. In this particular example, the Gen IDs may be implemented in binary code, such as, for example in 32-bit binary code. The lower order bit(s) of a Gen ID implemented in binary code may be used to determine which of the two memory regions holds the corresponding snapshot/version of data. The same Gen ID values for each generation within the data structure 100 may be shared between readers and writers for every distinct generation lock. Step 204 may also set a load acquire barrier for a read transaction, which signals a beginning of a read transaction. The load acquire barrier may be a read-acquire operation or an acquire fence, which prevents memory re-ordering of any tasks preceding the load acquire barrier with any read and/or write transactions following the load acquire barrier. In certain embodiments, the read-acquire operation may be a lock-free operation. An exemplary implementation of step 204 may be represented, for example, as a "genRdBegin" function for beginning a read transaction may be represented as follows:

```
GENERATION genRdBegin
(
GEN_LOCK_RD_CTX * ctx       /**< reader context for generation lock */
);
Returns
```

The current generation ID.

In step 206, the method 200 reads the requested data from the data storage portion 102 of the selected generation of the data structure 100. In particular, the requested data may be copied from the data storage portion 102 of the selected generation to a separate memory buffer that can be freely accessed by the requesting task, process, thread, and/or processor. The separate memory buffer may be a local buffer to the requesting task. The requesting task, process, thread, and/or processor is permitted to copy data from the data structure 100, but may not be permitted to refer to any portion of the data structure 100, e.g., a generation or a data storage portion 102 of a generation, by reference e.g., a pointer that is directed to any data storage portion 102 or any other portion of the data structure 100.

After all of the data of interest is copied from the data storage portion 102 of the selected generation of the data structure 100 to a separate memory buffer, the method 200 proceeds to step 208 to determine if the read transaction is valid. To validate the read transaction, step 208 assesses whether the most recently modified generation of the data structure 100 has remained consistently the same throughout the read transaction—from when a load acquire barrier is set (step 204) to the copying of desired data from the data storage portion 102 of the current generation to a memory buffer (step 206). Step 208 may successfully validate when no write transactions are completed once a read transaction has been initiated. For example, step 208 may compare the generation of the data structure 100 selected in step 204 to the most recently modified generation, and if both are the same, the read transaction is validated. In certain embodiments, the validation of the read transaction may include loading the current generation of the data structure 100 and that load must be executed with a sequentially consistent load barrier to provide a memory barrier between the data structure and the data copied into the local buffer. The sequentially consistent load barrier may be set in a CPU-architecture via explicit memory barriers. The shared data may not be accessed after the sequentially consistent load barrier is set, a new read transaction may be initiated if additional read accesses are required. To re-access the data structure 100, the same task, process, thread and/or processor may initiate a second read request to restart method 200 in response to the second read request.

If the read transaction cannot be validated, e.g., the generation from which data is read is an older generation as compared to the most recently modified generation, the method 200 discards the previously read data and returns to step 204 to re-select an appropriate generation of the data structure 100, e.g., a most recently modified generation of the data structure 100. One reason that a read transaction may fail to validate is that one or more concurrent write transactions finish before method 200 reaches step 208—i.e., between where the read transaction starts (step 204) and when it is finished (step 208).

If method 200 returns to step 204, the read context may be modified to indicate that the read operation has been restarted. In certain embodiments, the method 200 permits the read transaction to fail only once, the second read transaction is performed with the write lock held to ensure that a reader may never "live lock." Thus, in some embodiments, if the read context indicates that the read operation had been attempted but previously failed, the method 200 may repeat the read transaction pessimistically, e.g., the second read transaction is conducted with mutual exclusion with respect to write transactions. For example, if the method 200 returns to step 204, the load-acquire barrier may be a lock that prevents write transactions from modifying the data structure 100, while read transactions may still run concurrently. A live-lock may occur if "optimistic reading" (no lock is held during the read operation) is performed on the second read attempt and any subsequent read attempts. A synchronization mechanism that includes serializing access to some shared data may be referred to as "pessimistic locking." Alternatively, optimistic reading utilized for all read attempts. Other mechanisms may be used to avoid a live-lock, for example, by adjusting a frequency of write transactions such that it is sufficiently infrequent to avoid live-lock, for example, a maximum of one write transaction for at least one concurrent read transaction. An exemplary implementation of step 208 may be represented, for example, as a "genRdFinish" function for finishing a read transaction may be represented as follows:

```
BOOL genRdFinish
(
GEN_LOCK_RD_CTX * ctx      /**< reader context for generation lock */
);
Returns
```

TRUE if the generation was stable throughout the transaction, or FALSE if the generation changed which means that the transaction must be restarted and the read data must be discarded.

In one embodiment, the genRdFinish function may serve two purposes: return whether the read transaction is successful, and provide a barrier, in particular, a sequentially consistent load of Gen ID. The sequentially consistent load ensures that all loads from the shared data is finished before the load of the Gen ID start.

In one exemplary embodiment, a first read transaction is an optimistic read-load-acquire of data from the current generation of the data structure 100, copy the shared data of interest into a local (to the reading task) buffer followed by a sequentially consistent load barrier, and comparing the Gen ID from a first load with the Gen ID of a second load to determine if they are the same. If so, then the data is determined to be consistent. In particular, no shared memory region may be written (stored) and therefore, no cache lines on non-local CPU cores need to be invalidated, which is typically a slow process and limits scalability across systems with many CPU cores.

An exemplary implementation of a method 200 for reading from a generation lock 140 protected data structure 100, may be represented as follows:

```
LOCAL UINT32      data[2][10];   /* two areas of 10 integers */
LOCAL GEN_LOCK   lock;           /* protects [data] */
...
UINT32 readNth
    (
    UINT32 nth,    /* element to read */
    )
    {
    UINT32              val;
    GENERATION          gen;
    GEN_LOCK_RD_CTX     ctx;
    genRdCtxInit (&ctx, &lock);
    do
        {
                gen = genRdBegin (&ctx);    /* load-acquire barrier */ val = data [gen & 1] [nth]; /* copy of shared data into
                                               local storage 'val'
        */
        }
                while (!genRdFinish (&ctx));  /* sequentially
    consistent
                                                 load to ensure that
    the
                                                 value
    data[gen&1][nth]
                                                 has finished */
        return val;
    }
```

Figure 3:
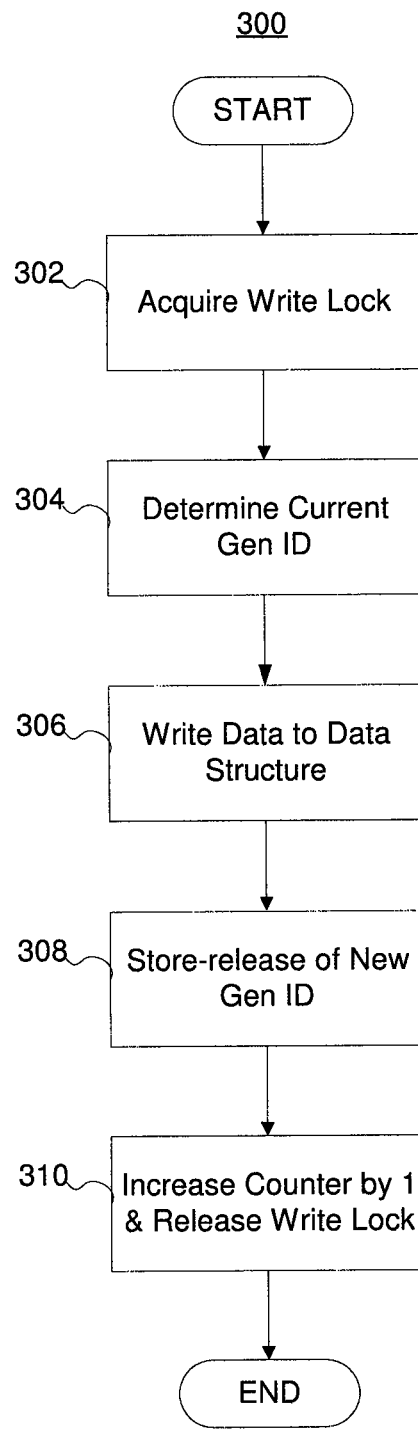
FIG. 3 shows an exemplary method for writing to a generation lock protected data structure in a multitasking processing environment.

FIG. 3 illustrates an exemplary method for writing to a data structure 100 that is protected by a generation lock 140. The method 300 described herein provides a method for writing data to a generation lock 140 protected data structure 100 after receiving a request for a write transaction from a task, process, thread, and/or processor. The exemplary method 300 described below grants a writing transaction exclusive access to modify the data stored within the data structure 100 for the duration of the write transaction. The exemplary method 300 prohibits concurrent write transactions, but may allow for concurrent read transactions. The method 300 will be described with reference to the exemplary system 10 of FIG. 1; however, those of skill in the art will understand that this is only exemplary and that the method 300 may be implemented by various other systems as well.

In step 302, the write transaction is initiated. Step 302 may sets a write lock to the data structure 100, which excludes access to the data structure 100 by other write transactions. The write lock may comprise load acquire semantics. Alternatively, the write lock may be an acquire operation or an acquire fence, which prevents memory re-ordering of any tasks proceeding the acquire barrier with read and/or write transactions following the acquire barrier. An exemplary implementation of step 302 may be represented, for example, as a "genWrTake" function generating a write lock may be represented as follows:

```
GENERATION genWrTake
(
GEN_LOCK * lock      /**< generation lock to take for writing */
);
Returns
```

The current generation ID.

Next, step 304 determines the Gen ID of the current generation (or version/snapshot) of the data structure 100. For example, if N generations of data have been stored within the data structure 100, the Gen ID of the current generation may be a value of N. The Gen IDs for each generation of the data structure 100 may be shared by a plurality of tasks, threads, processes, and/or processors in order to provide synchronization of a plurality of read and/or write transactions. For example, the same Gen ID values for each generation of the data structure 100 may be used between a plurality of threads configured to request read and write transactions of the generation lock 140 protected data structure 100.

In step 306, the method 300 writes the data provided by the requesting task, process, thread, and/or processor to the data structure 100. For example, the method 300 may generate a new generation within the data structure 100 having a data storage portion 152 for storing a new version of data and a new Gen ID 154, representing an increment to the next generation. For example, if the current shared data state, i.e., the current generation of the data structure 100, is assigned a Gen ID of N prior to the write request, the state of the share data after modification, i.e., the next generation of the data structure 100, may be assigned a Gen ID of N+1. The new version of data stored within the data storage portion 152 of the new generation may include all of the data of stored within the data storage portion 102 of the previous generation as modified with new requests from the write transaction. However, there is not any requirement on a relationship or correlation between the data stored within two consecutive generation of the data structure 100. In one particular embodiment, the data stored within the data storage portion 102 of the most recent generation of the data structure 100 may be copied to the data storage portion 152 of the new generation and further modified with the data provided by the requesting task, process, thread, and/or processor.

After all of the requested data is written to a new generation of data within the data structure 100, the method 300 proceeds to step 308 and provides a store-release barrier to the write transaction. Next in step 310, method 300 finishes the write transaction. Specifically, step 310 may atomically move the protected data to the next generation, e.g., move from a generation having a Gen ID of N to N+1.

It is possible that a task does not know whether it will modify the shared data, it is perfectly valid to assume that the data will be modified, and therefore, start a write transaction. If it turn out that the shared data did not have to be modified, then the write transaction can be finished with the "newGen" parameter (the second parameter) to function genWrGive( ) set to FALSE. The store-release barrier for the write transaction signals that the write transaction is complete, such that all of the write load/store preceding the release barrier will occur before the release barrier.

An exemplary implementation of a method 300 for writing to a generation lock 140 protected data structure 100 to update an nth element may be represented as follows:

```
LOCAL UINT32      data[2][10];   /* two areas of 10 integers */
LOCAL GEN_LOCK    lock;          /* protects [data] */
...
void writeNth
    (
    UINT32 nth,      /* element to read */
    UINT32 newVal,   /* new value to at the [nth] positiion */
    )
    {
    UINT32      curIdx;      /* [data] index for current generation */
    UINT32      nextIdx;     /* [data] index for next generation */
    curIdx = genWrTake (&lock) & 1;
    nextIdx = curIdx ^ 1;
    memcpy (data [nextIdx], data [curIdx], sizeof data[0]);
    data [nextIdx] [nth] = newVal;
    genWrGive(&lock, TRUE);
    }
```

In an embodiment described above, the memory areas that are used for earlier generations of the data structure 100 may remain valid. Therefore, the system 10 is capable of providing a liveness guarantee when the data structure 100 is subject to concurrent requests from a plurality of processor cores 110, 120, 130. Alternatively, memory locations associated with older generations in the data structure 100 may be freed and reused. For example, a cache, such as a neighbor- and peer-cache, may be protected by a generation lock 140 that also reuses an existing memory location within its own structure. In one exemplary embodiment, a memory location for an existing generation may be reused. In particular, the existing memory location that is to be reused may not be modified, unless it has been confirmed that there are no read transactions concurrently reading the existing memory location. More particularly, step 208 should also considered a data structure 100 having a reused memory location to be valid. Specifically, an existing memory location to be reused may be first marked as free. The write operation may then move to the next generation, initialize the read context for an intermediate entry, add the reused memory location as the current generation of data, and move to yet another generation, where a new entry is present.

The addition of the intermediate entry ensures that the new generation of data is either not modified, i.e., the read transaction finishes before the intermediate generation is complete or visible, or not potentially inconsistent. Potentially inconsistent data may not be validated because the generation of data that is to be accessed changed/moved to the next generation before the read transaction is finished. For example, one situation that could potentially return incorrect data without use of the intermediate generation described above is when a read transaction reads the very memory location that has been designed for reuse by a concurrent write transaction. The write transaction could then start to modify the memory location to be reused after the reader starts to read data from the same memory location, but before the relevant data is copied from the data structure 100 to a separate memory buffer. The read transaction could potentially finish before the data structure 100 adds the next generation, which would be accepted by step 210 as valid. In order to prevent such an error, a method for moving the generation lock 140 to the next generation may be applied. In particular, the method for moving the generation lock 140 to the next generation may be performed while a write lock is held. An exemplary implementation of a method for moving the generation lock 140 to the next generation may be implemented, for example, as a "genWrForceNext" function for initializing a generation lock represented as follows:

---

GENERATION genWrForceNext
(
GEN_LOCK * lock         /**< Generation lock to force a new generation */
);
Returns

---

The new generation ID.

EXAMPLES

Example I

In Example I, the data structure 100 may be used to store protected data having a sequence of integers, and that through the duration of a task or process, that sequence may be as follows:
Gen ID #1: [10,20,30]
Gen ID #2: [10,20]
Gen ID #3: [20,40,60]

This exemplary data structure may be implemented in two physical regions where an array may be stored. The two physical regions of the array may be memory locations A and B. The first generation of data may be stored at location A and assigned a Gen ID of 1. At the start of a read transaction, the current generation may correspond to a generation having a Gen ID of 1 to indicate to the read transaction that the data is stored at location A. A read transaction may read the data stored at Gen ID #1, such as the second position, which contains the integer 20. A write operation may seek to remove the third integer in the sequence, which contains the integer 30. The current generation may correspond to a generation having a Gen ID of 1, and therefore, the next generation may have a Gen ID value of 2. As discussed above, Gen ID #1 correspond to storage location A. A Gen ID value of 2 may correspond to storage location B. One exemplary way to remove the third integer from the data set is to copy all of the elements that are not to be removed into a new storage location, e.g., from location A to location B in this example. In this example, if a read transaction is started before Gen ID #2 has been completed, the read transaction may retrieve data from the dataset corresponding to Gen ID #1 and therefore read from memory location A. If a second write request is made, the write transaction starts with the dataset stored in Gen ID #2, which is located at location B, and writes to the next storage location which is in location A. The second write transaction may finish updating and complete the dataset for the second generation—Gen ID #2—before the read transaction is finished. In this example, the read transaction may be reading inconsistent data because the second write transaction updated the data stored in memory location A while the reader is conducting a read transaction. The data obtained by the read transaction may therefore include information that were not part of the data set stored within the generation lock protected data structure. However, because the Gen ID of the current generation changed during the read transaction, the read transaction will fail and start the read transaction at Gen ID #2. The second attempt at a read transaction will obtain information written to the generation having a Gen ID of 2 by the second write transaction, and can only be returned after the second write transaction has finished all updates to the new generation within the data structure 100 via a store operation with release semantic.

Example II

Examples II through V provided below are based on a simple data structure that is configured to hold zero or one data instance that is protected by a generation lock. In these examples, two memory areas and/or handles may be allocated to the data structure for each example below.

In the exemplary embodiment of Example II, the generation lock 140 receives only a single request for a read transaction for the data stored by data structure 100. In this embodiment, the data may be accessed in an exemplary method having the following steps:

1. Initialize a read context structure for retrieval of data from the data structure 100
2. Begin a read transaction and set a load-acquire barrier.
3. Determine the size of the data structure 100. In this Example I, the size of the data structure 100 is 1. Using the least significant bit of the Gen ID corresponding to the counter, one of the two memory areas are selected from which data will be read. The least significant bit of the Gen ID may be used because the Gen ID may be store in binary and the least significant bit provides an even/odd indicator. An even Gen ID may correspond to a first memory location and an odd Gen ID may correspond to a second memory location.
4. Copy all the data that is of interest from the selected memory area into a buffer local to the requesting thread, for example, into an automatic variable.
5. Finish the read transaction and set a sequentially consistent load barrier.

Once a sequentially consistent load barrier is set in step 5, the requesting thread is not permitted to access the data protected by generation lock without initiating a separate read request. Therefore, any information that is needed from the generation lock 140 protected data structure 100 should be copied into a separate memory buffer for the current task or thread before completing the read transaction.

Example III

In the exemplary embodiment of Example III, the generation lock 140 receives both a request for a read transaction and a request for a write transaction with the generation lock 140 protected data structure 100. In this particular example, the write transaction is completed after the read transaction. The data structure 100 may be accessed in accordance with an exemplary method having the following steps:

1. Initiate a write transaction by acquiring a write lock and returning the Gen ID for the most recent generation of data stored within the data structure 100.
2. Select one of the two memory areas to which new data is written based on the inverse of the least significant bit of the Gen ID. The inverse of the least significant of the current generation ID may be different from the least significant bit of the current generation. Therefore, the inverse of the least significant bit of the current generation, N, in binary will correspond to the least significant bit of the next generation, N+1.
3. Write data to the data structure 100.
4. Initialize a read context structure for retrieval of data from the data structure 100
5. Begin a read transaction, set a load-acquire barrier, and return a same Gen ID as step 1 as the current generation.
6. Using the least significant bit of the Gen ID from step 5, select from which one of the two memory areas data will be read.
7. Copy all the data that is of interest from the selected memory area into a buffer local to the requesting thread, for example, into an automatic variable.
8. Finish the read transaction and confirm that the read transaction is valid. The read transaction is valid if the most recently modified node remained consistently the same node throughout the read transaction. The read transaction in Example III should be validated because the counter had not been modified in steps 1-7 to a subsequent Gen ID.
9. Finish the write transaction, release the write lock, and increment the counter by 1.

The data obtained in the read transaction is consistent because step 7 requires that the data be copied to a buffer local to the requesting thread and not modify the generation lock protected data structure.

Example IV

In the exemplary embodiment of Example IV, the generation lock 140 receives both a read request and a write request for data stored by a generation lock 104 protected data structure 100. Also, in this example, the write transaction is completed before the read transaction. In this embodiment, the data may be accessed in an exemplary method having the following steps:

1. Initiate write transaction by acquiring a write lock and returning the Gen ID of the most recent generation of data stored within the data structure 100.
2. Initialize a read context structure for retrieval of data from the data structure 100
3. Begin a read transaction, acquire read barrier, and return as the same Gen ID as step 1—e.g., Gen ID=N.
4. Copy all the data that is of interest from the selected memory area into a buffer local to the requesting thread, for example, into an automatic variable.
5. Write data to the one of the two memory areas to which new data is written selected, the memory area is selected based on the inverse of the least significant bit of the Gen ID.
6. Finish the write transaction, release the write lock, and assign a new Gen ID for the new generation of data, e.g., an increment to the Gen ID by 1—the new Gen ID is N+1.
7. Determine whether the read transaction is valid. In Example IV, the read transaction may be not validated because the counter has not remained consistent throughout the read transaction. Rather, the counter was incremented from N to N+1. Therefore, the read transaction must be restarted with a barrier that prohibits concurrent write transactions.

Example V

In the exemplary embodiment of Example V, the generation lock 140 receives two write requests and a read request for data stored by a data structure 100 protected by a generation lock 140. Also, in this example, the two write transactions are completed before the read transaction. In this exemplary embodiment, the data may be accessed in the an exemplary method having the following steps:

1. Initialize a read context structure for retrieval of data from the data structure 100
2. Return as the same Gen ID as step 1—e.g., Gen ID=N.
3. Initiate a first write transaction by acquiring a write lock, write data to the data structure 100, release the write lock, and increment the counter by 1—e.g., a new Gen ID=N+1 is assigned to the next generation.
4. Initiate a second write transaction by acquiring a write lock and returning a value for the Gen ID of the most recent generation that was accessed—e.g., Gen ID=N+1.
5. Write data to the one of the two memory areas in the node having a Gen ID as determined in step 4, e.g., Gen ID=N+1—the memory area is selected based on the inverse of the least significant bit of the Gen ID. It is noted that this is the same generation of data from which the read transaction is reading data. The current generation may be moved through a store-release operation that stores the value of the next increment from the current generation. For example, this may occur in the genRdGive function when the "new Gen" parameter is set to TRUE.
6. Write data to the one of the two memory areas one of the two memory areas to which new data is written selected based on the inverse of the least significant bit of the Gen ID, finish the write transaction, and release the write lock and assign a new Gen ID to the new generation—increased to N+2.
7. Copy all the data that is of interest from the data structure 100 into a buffer local to the requesting thread.
8. Determine whether the read transaction is valid. In Example IV, the read transaction would find that most recently accessed generation was not consistent for the duration of the read transaction, and that the Gen ID was increased from N to N+2. Therefore, the read transaction must be restarted with an updated Gen ID at N+2 and a barrier that prohibits concurrent write transactions.

Those skilled in the art will understand that the above-described exemplary embodiments may be implemented in any number of manners, including as a separate software module, as a combination of hardware and software, etc. For example, the exemplary methods 200, 300 may be embodiment in one or more programs stored in a non-transitory storage medium and containing lines of code that, when compiled, may be executed by at least one of the plurality of processor cores or a separate processor.

The exemplary embodiments described and claimed herein is not to be limited in scope by the specific embodiments herein disclosed since these embodiments are intended as illustrations. Any equivalent embodiments are intended to be within the scope of this application. Indeed, various modifications in addition to those shown and described herein will become apparent to those skilled in the art from the foregoing description. Such modifications are also intended to fall within the scope of the appended claims. All publications cited herein are incorporated by reference in their entirety.

What is claimed is:

1. A method for reading from a generation lock protected data structure comprising:
storing a data structure, wherein the data structure comprises N generations and each generation is associated with a generation identifier, the generation identifier is an integer from 0 to N, wherein 1 is associated with an earliest-created generation in the data structure and N is associated with a most recently modified generation in data structure,
wherein each generation is configured to be accessed and comprises a data storage portion including stored data, wherein the most recently modified generation in the data structure is created based on a write transaction modifying the stored data of a previously created generation in the data structure,
wherein a processor is permitted to read a select portion of the data from the data structure based on:
(a) receiving, by the generation lock, a read request from the processor to read the select portion of data from the data structure;
(b) creating a read context in response to the read request;
(c) copying the select portion of data from the data storage portion of the most recently modified generation of the data structure to a memory buffer, wherein the processor reads the select portion of data from the memory buffer; and
(d) determining if the most recently modified generations in the data structure remained consistent from step (b) to step (c), and if not, repeating steps (b) to (d).

2. The method of claim 1, wherein the data structure is read more often than it is modified.

3. The method of claim 1, wherein the stored data within the data structure comprises one or more subsystems of an operating system.

4. The method of claim 1, wherein the method for reading from the generation lock protected data structure is executed concurrently with a further method for reading from the data structure.

5. The method of claim 1, wherein step (b) comprises generating a load-acquire harrier for reading from the data structure.

6. The method of claim 1, wherein step (b) comprises generating a full memory fence for reading from the data structure.

7. The method of claim 5, wherein step (d) comprises determining if the most recently modified generation remained consistent from step (b) to step (c), if not repeat steps (b) to (d) in mutual exclusion with the method for writing to the data structure.

8. A method for writing to a generation lock protected data structure comprising:
storing a data structure, wherein the data structure comprises N generations and each generation is associated with a generation identifier, the generation identifier is an integer from 0 to N, wherein 1 is associated with an earliest-created generation in the data structure and N is associated with a most recently modified generation in data structure,
wherein each generation is configured to be accessed and comprises a data storage portion including stored data, wherein the most recently modified generation in the data structure is created based on a write transaction modifying the stored data of a previously created generation in the data structure,
wherein a processor is permitted to write data to the data structure based on:
(a) receiving, by the generation lock, a write request from the processor to write the data to the data structure;
(b) generating a write lock in response to the write request, the write lock prohibits another processor from concurrently writing to the data structure;
(c) determining the generation identifier for the most recently modified generation of the data structure;
(d) adding a new generation, to the data structure, and writing the data to the new generation;
(e) releasing the write lock;
(f) assigning a new generation identifier to the new generation, wherein the new generation identifier corresponds to a value corresponding to the generation identifier determined in step (c) incremented by 1.

9. The method of claim 8, wherein the structure is read more often than it is modified.

10. The method of claim 8, wherein the stored data within the data structure comprises one or more subsystems of an operating system.

11. The method of claim 8, wherein the generation identifier has a value of N in step (c).

12. The method of claim 8, wherein step (e) comprises providing a store-release semantic.

13. A system comprising:
a plurality of processors;
a generation lock protected data structure, wherein the data structure comprises N generations, each generation is associated with a generation identifier, the generation identifier is an integer from 0 to N, wherein 1 is associated with an earliest-created generation in the data structure, and N is associated with a most recently modified generation of the data structure,
wherein each generation is configured to be accessed and comprises a data storage portion including stored data, wherein the most recently modified generation in the data structure is created based on a write transaction modifying the stored data of a previously created generation in the data structure; and
a first set of instructions executing on at least one of the plurality of processors, the first set of instructions being operable to:
(a) receive, by the generation lock, a first read request to read a select portion of data from the data structure;
(b) create a read context in response to the read request;
(c) copying the select portion of data from the data storage portion of the most recently modified generation of the data structure to a memory buffer, wherein a processor of the plurality of processors that requested to read a select portion of data from the data structure reads the select portion of the data from the memory buffer; and
(d) determining if the most recently modified generation remained consistent from step (b) to step (c), and if not, repeating steps (b) to (d).

14. The system of claim 13, further comprising a second set of instructions executing on at least one of the plurality of processors, the second set of instructions being operable to:
(e) receive, by the generation lock, a write request to write data to the data structure;

(g) generating a write lock in response to the write request, the write lock prohibits concurrently writing to the data structure;
(h) determining the generation identifier for the most recently modified generation of the data structure;
(i) adding a new generation to the data structure, and writing data to the new generation;
(j) releasing the write lock; and
(k) assigning a new generation identifier to the new generation, wherein the new generation identifier corresponds to a value corresponding to the generation identifier determined in step (h) incremented by 1.

15. The system of claim 13, wherein step (b) comprises generating a load-acquire barrier for reading from the data structure.

16. The system of claim 13, wherein step (b) comprises generating a full memory fence for reading from the data structure.

17. The system of claim 13, Wherein step (j) comprises providing a store-release semantic.

* * * * *